United States Patent Office 2,862,123
Patented Nov. 25, 1958

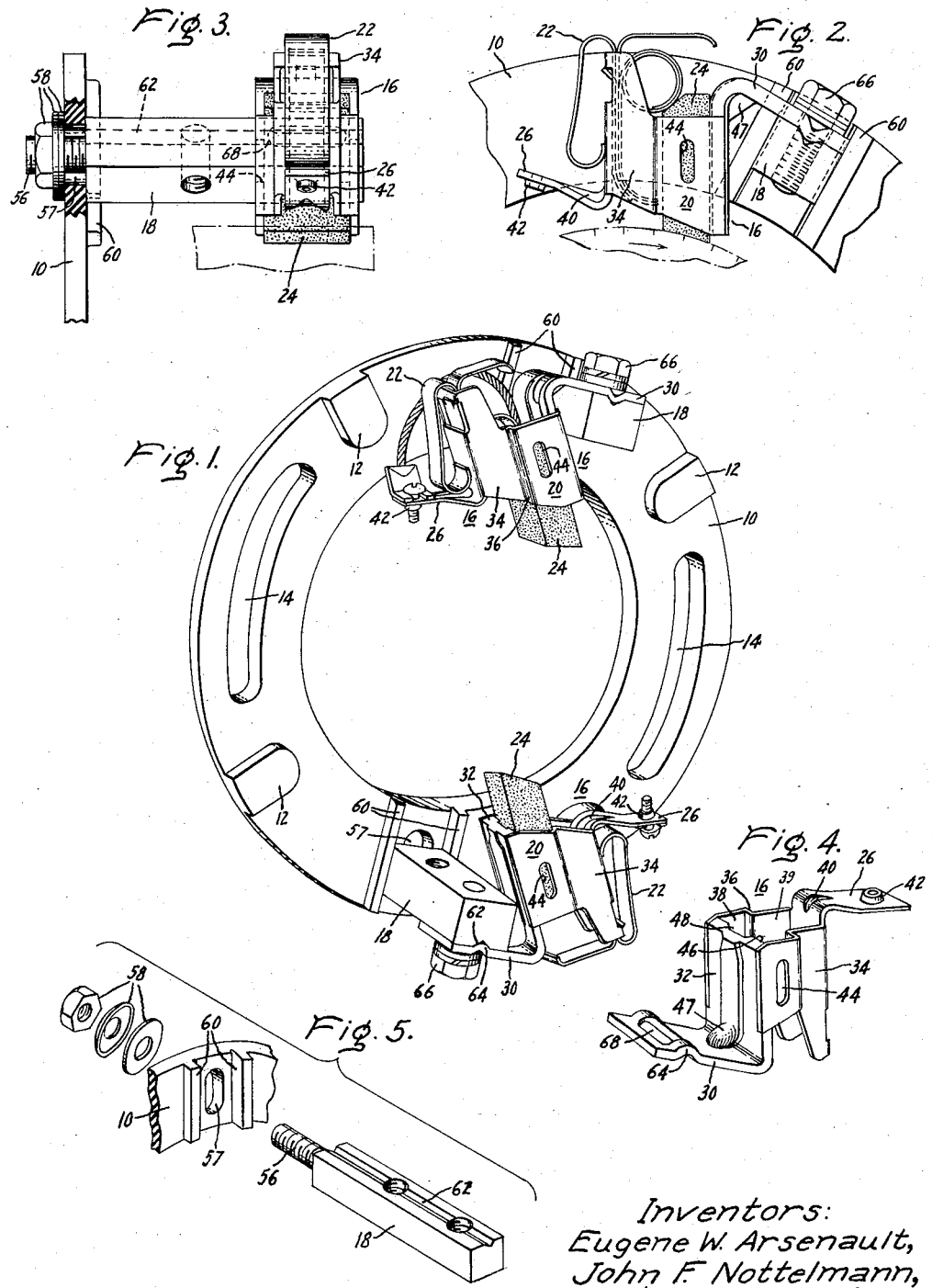

2,862,123

BRUSH HOLDER AND RIGGING ASSEMBLY

Eugene W. Arsenault, Dover, N. H., and John F. Nottelmann, Erie, Pa., assignors to General Electric Company, a corporation of New York Application September 4, 1956, Serial No. 607,611

8 Claims. (Cl. 310—241)

The invention described herein relates to dynamoelectric machines and more particularly to a brush holder and rigging assembly designed in a manner to provide an improved reaction surface for a carbon brush and to permit radial and axial adjustment of the holder on a mounting plate positioned adjacent a commutator of the machine.

It is now common practice to utilize a longitudinally coiled spring on a brush holder for exerting a constant predetermined force on a carbon brush throughout the life thereof. The development of such a spring has eliminated many vexatious problems heretofore encountered in attempting to provide structure capable of applying a constant pressure of known value on a brush regardless of its state of wear. The forces created by the combined action of the above-described spring on a carbon brush and that resulting from the commutator urging the brush against the back surface of the brush holder, commonly called a reaction surface, are such that a high degree of flatness and accuracy in the reaction surface are required to prevent movement of the brush during operation of the machine. Prior fabricated brush holders have not had this high degree of flatness and accuracy. Such movement is effective in adversely changing the operating characteristics of the machine and one of the primary objects of this invention is to provide a brush holder having a broached surface arranged for coaction with other parts of the holder for firmly holding a carbon brush in the holder in a manner to preclude movement therein, thereby supplying stability to the brush during operation of the machine.

Stiffness in a brush holder is a desirable feature since it tends to impede the generation of vibrations and prevents the holder from resonating at the same frequencies appearing in the machine. Prior art holders utilize elaborate supporting structures or exceptionally heavy holders to obtain stiffness and rigidity, and another object of the invention is therefore to provide a brush holder wherein the parts effective in lending stiffness to the holder simultaneously serve to provide a reaction surface and to properly position the holder with respect to a reaction surface and to properly position the holder with respect to a commutator for the machine.

The relative position of the brush holder and therefore the carbon brush with respect to the machine commutator is important in order to obtain proper commutation of voltages and even brush wear in addition to performance of other known functions necessary for efficiency in machine operation. Aligning of the holder on the machine to obtain proper operation requires excessive time and labor and prior structures are subject to the disadvantage of having to repeat the aligning process each time a brush holder is installed or removed from the machine. Still another object of our invention is to eliminate this inadequacy by providing a brush holder rigging assembly which remains permanently aligned with the commutator when the brush holder is removed from the machine thereby permitting installation of a new holder without having to repeat the steps necessary in obtaining alignment.

In carrying out our invention we provide a brush holder and rigging assembly capable of carrying out the objects of the invention described above by providing a brush holder having a stiffening member therein designed in a manner to simultaneously serve as a reaction surface and also to support the brush holder assembly on a yoke provided for the machine. The brush holder is constructed and arranged to be detachable from the yoke while parts effecting such attachment remain in a permanent position thereby permitting removal and insertion of the brush holder without the necessity of engaging in an alignment process.

While the specification concludes with claims particularly pointing out and distinctly claiming the subject matter which we regard as our invention, it is believed the invention will be better understood from the following description taken in connection with the accompanying drawing in which:

Figure 1 is a perspective view of a yoke supporting a pair of identical brush holders adapted for holding carbon brushes in engagement with the commutator for a dynamoelectric machine;

Figure 2 is a view in elevation of one of the brush holders shown in Figure 1;

Figure 3 is a side view in elevation of the brush holder shown in Figure 2;

Figure 4 is a perspective view of a brush holder designed according to the present invention; and Figure 5 is an exploded view of parts utilized in attaching a brush holder to a yoke in the manner shown in Figure 1.

Referring now to the drawing wherein like reference characters designate like or corresponding parts throughout the several views, there is shown in Figure 1, a yoke 10 provided with bosses or lugs 12 and elongated slots 14 of such size to permit rotation of the yoke through a wide arc when positioned adjacent the commutator. A pair of identical brush holders 16 are oppositely disposed from each other on the yoke and are arranged for attachment thereto by a stud 18 rigidly affixed to the yoke 10 in a manner hereinafter described. Although only a pair of brush holders and studs have been shown, it will be obvious that any number can be mounted on the yoke according to that required for a particular machine. As shown, each of the brush holders is provided with a main hollow body 20 provided with a spring assembly 22 for urging a brush 24 into contact with a commutator (not shown). A pig tail tab 26 is integrally formed on the brush holder for receiving an end of an electrical conductor while the other side of the brush holder is provided with a bracket 30 adapted for attaching the brush holder to the stud 18. The spring assembly 22 is of a type disclosed and claimed in the co-pending application of John F. Nottelmann and Carl E. Spaeder, Serial No. 607,736, filed September 4, 1956, and assigned to the same assignee as the present invention.

Referring more specifically now to the brush holder of Figures 1-4, it will be seen that it consists of a relatively heavy bracket 30 preferably of bronze material formed at the angle illustrated to provide a reinforced upstanding backing member 32 which serves as a reaction surface for a brush adapted for positioning within the holder. Brazed or otherwise affixed to the sides of the backing member 32 is a box 34 having inwardly directed shoulders 36 which form an opening 38 for receiving the carbon brush, while the additional space 39 between shoulders 36 is designed to house the spring assembly 22. The pig tail tab 26 extending outwardly from the brush holder obtains additional strength from a stiffening rib or indenture 40 at the point where it curves away from the brush holder and a tapped eyelet or extruded hole 42 arranged in the tab provides for reception of a wire shunt attached to the brush. Window 44 formed in the side of the box 34 shows the degree of wear of a brush positioned therein.

In the past, brush holders have been made in a cast form in order to provide the strength and rigidity necessary for withstanding rugged use and also to obtain a reaction surface for the brush. As indicated above, an important factor in brush stability lies in the degree of flatness of the reaction surface against which the brush is adapted to rest. In the cast form of brush holder, it is not too difficult to shape the reaction surface but the labor and cost of materials involved in making such a surface is out of proportion to the final product cost. In order to obviate these disadvantages, we have constructed a prefabricated holder wherein the bracket 30 including the reaction surface 46 of backing member 32, is made of heavy material, which in the preferred embodiment, is ⅛" thick. Since the function of box 34 is merely to position the brush and spring assembly, it is not subjected to any forces of appreciable quantity and it therefore is constructed of light weight material and shaped to be conveniently brazed to the sides of the bracket.

It will be evident that by virtue of the fabricating process, the parts can be speedily shaped and milled to accurate tolerances prior to assembly. For example, the box 34 is made having dimensions just sufficient to receive a carbon brush thereby precluding movement thereof in the holder during machine operation, and the remainder of the box forming the cavity 39 for the spring assembly is accurately designed to utilize the least space possible. Further, the reaction surface is reinforced as at 47 and conveniently can be broached prior to assembly by grinding a slot 48 therein so as to allow carbon dust resulting from wear of the brush to pass unimpeded through the brush holder.

The important advantage derived from constructing the brush holder in this fashion is that the bracket 30 and integrally formed backing member 32 provides the brush holder with sufficient stiffness to withstand the forces which in prior brush holders causes undesirable vibrations. An equally important advantage is that of providing a smooth reaction surface designed in a manner to have a brush rest only on the sides formed by the slot 48 thereby presenting a minimum frictional surface while obtaining maximum brush stability.

In order to attach the brush holder to the yoke 10, the stud 18 is provided with a screw-threaded member 56 inserted in the end thereof and is arranged to pass through an elongated opening 57 formed in the body of yoke 10. A nut and lock washers 58 secure the stud to the yoke in a well known manner and the stud is prevented from turning thereafter by a pair of spaced projections 60 on the yoke which snugly fit the sides of stud 18. The stud is further provided with a V-shaped notch 62 designed to mate with a like V-shaped member 64 formed in an end of bracket 30. It will be apparent that upon placing the V-shaped members in alignment, insertion of bolt 66 will firmly lock the brush holder and stud into a rigid unit.

Axial adjustment of the brush holder 16 with respect to the commutator is accomplished by virtue of the elongated slot 68 formed in the bracket while transverse adjustment is made possible by elongated opening 57.

An additional versatile feature of the structure described herein is that the brush holders can be installed in a manner opposite to that shown in the event it is desired to have the machine operate in a counterclockwise direction.

Obviously many modifications and variations are possible in light of the above teachings. It is to be understood that within the scope of the appended claims the invention may be practiced otherwise than as specifically described.

What we claim as new and desire to secure by Letters Patent of the United States is:

1. A brush holder and rigging assembly for use with a dynamoelectric machine comprising a yoke having elongated slots therein for providing adjustment thereof around the peripheral surface of a commutator for said machine, means mounting a plurality of brush holders on said yoke, each of said means comprising a support member radially adjustable on said yoke and being retained in a position against rotary movement thereon by stop members integrally formed on said yoke, a brush holder including a channel for receiving a carbon brush rigidly affixed to said support member, and adjustable means on said brush holder arranged for coaction with said support member for permitting axial adjustment of said brush holder relative to said commutator.

2. A brush holder and rigging assembly for a dynamoelectric machine comprising a yoke having oppositely disposed elongated slots for permitting adjustment of said yoke around the peripheral surface of a commutator for said machine, means mounting a plurality of brush holders on said yoke, each of said means comprising a support member radially adjustable on said yoke and being prevented against rotary movement thereon by a pair of shoulders integrally formed on said yoke, a brush holder including a box having a pair of interconnected channels for respectively receiving a carbon brush and a spring assembly for urging the carbon brush into contact with said commutator, a side of said brush holder being constructed of heavier material than the remaining portions of said box to provide a reaction surface for said brush positioned therein, and a bracket member interconnecting said side with said support member for preventing movement of said brush holder on said support member after it is fixed in position, and means on said bracket permitting axial adjustment of said brush holder relative to said commutator for allowing for variations in manufacture of said machine.

3. A brush holder and rigging assembly for a dynamoelectric machine comprising a yoke having means supporting a plurality of brush holders in a manner permitting reversal of said brush holders on said yoke in order to accommodate said machine when rotated in an opposite direction, said means comprising a stud arranged for radial movement in an elongated slot provided on said yoke, a V-shaped channel formed in one side of said stud and extending the length thereof, stop means on said yoke arranged for engagement with opposite sides of said stud for preventing rotary movement thereof on said yoke, and a brush holder axially adjustable on said stud, said brush holder comprising a bracket having a V-shaped projection adjacent one end thereof designed for engagement with the V-shaped channel in said stud for preventing movement of said brush holder on said stud when the former is fixed in position, the other end of said bracket being curved and arranged to provide a reaction surface for a carbon brush, and a three-sided fabricated device formed in the shape of a U and arranged to have its exposed ends brazed to the sides of said bracket thereby to form a pair of interconnected channels for respectively receiving said carbon brush and a spring assembly for urging the carbon brush into contact with said commutator.

4. The combination according to claim 3 wherein said reaction surface is broached to provide a smooth surface for said brush and to permit exit of carbon dust resulting from wear thereof past said broached surface and out of said brush holder.

5. The combination according to claim 3 wherein said brush holder is provided with an extension for receiving a wire shunt for said carbon brush, and reinforcing means respectively provided on each of said bracket and said extension for providing strength and rigidity to said brush holder.

6. A brush holder and rigging assembly for use with a dynamoelectric machine comprising a box having sides forming a pair of interconnected channels respectively adapted for receiving a carbon brush and a spring assembly for urging the brush into contact with a commutator on the machine, said one of said sides on which said brush is adapted to rest being broached and made of heavier material than the remainder thereof for providing a stiff reaction surface for said brush, a radially adjustable member adapted for attachment to a yoke adjacent the commutator for said machine, bracket means interconnecting said one of said sides with said member, and an elongated slot on said bracket means arranged for coaction with said member for providing axial adjustment of said brush holder relative to said commutator.

7. A brush holder for use with a dynamoelectric machine comprising a fabricated strip of heavy material formed at an angle to provide a bracket on one end and a reaction surface for a carbon brush at its other end, said bracket having an elongated slot therein for furnishing axial adjustment to said brush holder when attached to a support member positioned adjacent a commutator for said machine, a three-sided fabricated member having its ends brazed to the sides of said heavy material adjacent said reaction surface to form a pair of interconnected channels for respectively receiving said brush and a spring assembly for urging said brush into contact with said commutator, an extension integrally formed on said fabricated member and positioned opposite said reaction surface for receiving the free end of a wire shunt attached to said carbon brush.

8. A brush holder for use with a dynamoelectric machine comprising a three-sided fabricated box having a projecting member arranged for receiving the wire shunt of a carbon brush, a strip of heavy material formed at an angle to provide a side for receiving the ends of said box and thereby form a pair of channels for a carbon brush and a spring for urging the brush into contact with a commutator for said machine, the side of said heavy material located within the confines of said box being broached to provide a smooth surface for said brush and the opposite side of said reaction surface being strengthened to provide ridigity to said brush holder, and a bracket extending outwardly from said reaction surface having a portion formed in a shape of a V to permit attachment of the brush holder to a support stud located adjacent said commutator, and an elongated slot in said portion for permitting axial adjustment of said brush holder with respect to said commutator.

References Cited in the file of this patent

UNITED STATES PATENTS

| | | |
|---|---|---|
| 1,478,665 | Lee | Dec. 25, 1923 |
| 1,727,917 | Zerbo | Sept. 10, 1929 |
| 2,426,815 | Burrus | Sept. 2, 1947 |
| 2,724,066 | Harter | Nov. 15, 1955 |

FOREIGN PATENTS

| | | |
|---|---|---|
| 371,301 | Germany | Mar. 13, 1923 |
| 734,858 | Great Britain | Aug. 10, 1955 |